Patented Aug. 15, 1939

2,169,809

UNITED STATES PATENT OFFICE 2,169,809

TREATMENT OF GASEOUS PARAFFIN HYDROCARBONS

Jacque C. Morrell, Chicago, Ill., assignor to Universal Oil Products Company, Chicago, Ill., a corporation of Delaware No Drawing. Application May 3, 1939, Serial No. 271,599

2 Claims. (Cl. 196—10)

This application is a continuation-in-part of my copending application Serial No. 161,587, filed August 30, 1937, which in turn is a continuation-in-part of my application Serial No. 32,638, filed July 22, 1935.

This invention relates more particularly to the treatment of normally gaseous paraffin hydrocarbons, that is, those which are gaseous at ordinary temperatures and pressures, for example, the butanes, preferably isobutane. In a more specific sense, the invention is concerned with a novel process for alkylating 4 carbon atom paraffin hydrocarbons with olefins which are normally gaseous to produce saturated hydrocarbons of higher molecular weight which can be utilized as components of motor fuel for automobile and airplane engines.

The utilization of these gaseous materials has been carried out in the past without catalysts by straight thermal treatment alone, or followed by polymerization of the olefins produced therefrom to produce motor fuels. The present process is a marked improvement on this type of operation.

In one specific embodiment, the present invention comprises the alkylation of normally gaseous paraffin hydrocarbons with normally gaseous olefin hydrocarbons at temperatures up to about $+20°$ C., utilizing sulfuric acid as a catalyst. A feature of the present invention is the utilization of sufficiently low temperatures so that the ordinarily vigorous action of sulfuric acid on catalytic condensation reactions among hydrocarbons is moderated so that reactions of alkylation occur in preference to other undesirable reactions. For good results it is important to use the proper combination of temperature, time of contact and amount and concentration of acid employed as a catalyst in order to avoid side reactions such as polymerization, oxidation and the like. Inasmuch as there is a considerable amount of heat evolved during the alkylation reaction employing sulfuric acid as a catalyst, it may be desirable to cool the normally gaseous paraffins, for example the isobutane, which is being alkylated with the normally gaseous olefins, so that the heat evolved during the reaction will not cause the temperature of the mixture to rise above the desired reaction temperature.

The amounts of acid employed are preferably large in comparison to the amounts of hydrocarbons undergoing reaction at any one time. Good results are obtainable using 20–100 volume of hydrocarbons, although in some operations, smaller volume percents of acid may be used when employing longer times of contact.

The concentrations of sulfuric acid which have been found desirable in the preferred temperature range, for example from about $-10°$ to about $+20°$ C., are generally in excess of 90%; for example, good results may be obtained in the alkylation of the normally gaseous paraffin hydrocarbons with normally gaseous olefins with concentrations of sulfuric acid from about 90% to approximately 96%. Depending upon the reactivity of the components in a given alkylation reaction, sulfuric acid of different concentrations may be employed as an additional means of regulation and the upper limits of temperature and concentrations of acid shown here may be varied to produce good results, providing they are properly coordinated. For instance, the reactions of isobutane with propylene may require more severe conditions such as somewhat higher temperature or higher acid concentration than the reactions of isobutane with the more reactive normal butylene. Pressures may be employed to assist the reaction and to prevent undue losses of material by vaporization and, when desirable, to maintain the hydrocarbons undergoing reaction substantially in liquid phase.

The process of the invention is applicable to the alkylation of butanes with their olefinic counterparts, the butylenes, with propylene and in some cases with ethylene. Iso-butane can be much more readily alkylated by normally gaseous olefins than normal butane which apparently has to undergo some isomerization prior to alkylation. These alkylation reactions are of particular importance in the oil industry in connection with the cracking process. The fixed gases ordinarily contain large quantities of 3 and 4 carbon atom hydrocarbons, both olefinic and saturated. Processes are in commercial operation which catalytically polymerize the 3 and 4 carbon atom olefins to form liquid products suitable as hydrocarbon motor fuel. However, the paraffinic hydrocarbons in these gases are substantially unaffected in these processes. Furthermore, the production of high octane motor fuel such as iso-octanes requires two steps of treatment such as isobutylene polymerization followed by hydrogenation, whereas in the present process iso-octanes are formed by direct alkylation, for example, of isobutane by either normal or iso-butylene. The actual operation of the process admits of some modification, depending upon the normal phase of the reacting constituents and whether batch or continuous operations are employed.

In a simple type of batch operation, a paraffin to be alkylated such as, for example, isobutane, is brought to a temperature within the approximate range specified in the presence of the necessary amount of the sulfuric acid catalyst and its alkylation is affected by the gradual introduction of an olefin, such as, for example, isobutylene, under the surface of the liquid which may be mechanically stirred to effect intimate contact between catalyst and reacting compounds and prevent subsidence of the acid or acid sludges which are heavier than the liquid menstrum. Alkylation may be allowed to progress to different stages of reaction. In the case of the alkylation of butanes with propylene or butylenes, the best products from the standpoint of motor fuel usually are produced by the condensation of equimolecular quantities. It is preferable to maintain an excess of paraffin at all times in the reaction zone as in the method of operation above described. This tends to minimize undesirable polymerization reactions.

As illustrative of the type of results normally obtainable by the use of the present process, the following example is shown, although it is not given with the intention of unduly limiting the generally broad scope of the invention:

50 parts of isobutane was alkylated by an approximately equal volume of n-butylene. The isobutane was cooled somewhat to offset the heat of reaction. Sulfuric acid of about 95% concentration was employed; the quantity of acid was such as to give the time of contact required to produce the desired results; the actual temperature of the reaction mixture was maintained between 15° and 20° C., and the reaction mixture was kept in suspension by an efficient stirring device. During vigorous agitation, a stream of normal butylene was introduced to accomplish the alkylation. The butylene was added at such a rate that it was substantially completely absorbed. After the requisite amount had been passed into the acid-oil mixture, the stirring was stopped and the sludge allowed to settle. The upper hydrocarbon layer was then found to consist of 85 parts by weight of hydrocarbon product which was paraffinic as indicated by its non-reactivity with potassium permanganate solution and nitrating mixture. This hydrocarbon layer was principally a mixture of octanes of an isometric character along with some lower molecular weight products. The octane number by the C. F. R. method was found to be over 83.

The broad scope of the present invention is evident from the preceding specification, and the results obtainable by its use in practice are evident from the examples given, although neither section is intended to be unduly limiting.

What I claim is:

1. A process for producing gasoline boiling hydrocarbons from normally gaseous iso-paraffin and olefin hydrocarbons which comprises simultaneously contacting a normally gaseous iso-paraffin and a normally gaseous olefin with sulfuric acid at a controlled reaction temperature, and correlating the amount and concentration of the acid, the reaction temperature and the proportion of olefin to iso-paraffin to effect alkylation of the iso-paraffin with the olefin as the principal reaction in the process with minimum olefin polymerization, thereby chemically combining the normally gaseous iso-paraffin and olefin to form a heavier hydrocarbon boiling in the gasoline range.

2. A process for producing gasoline boiling hydrocarbons which comprises simultaneously contacting iso-butane and a butylene with sulfuric acid at a controlled reaction temperature, and correlating the amount and concentration of the acid, the reaction temperature, and the proportion of butylene to iso-butane to effect alkylation of the iso-butane with the butylene as the principal reaction in the process with minimum butylene polymerization, thereby chemically combining the iso-butane and butylene to form a heavier hydrocarbon boiling in the gasoline range.

JACQUE C. MORRELL.